United States Patent [19]

Decorps et al.

[11] Patent Number: 5,198,770

[45] Date of Patent: Mar. 30, 1993

[54] LOGGING APPARATUS HAVING A WALL ENGAGING PAD WITH LONGITUDINALLY ALIGNED DETECTING DEVICES

[75] Inventors: Jean-Luc Decorps, Antony; Alain Dumont, Paris; Alan Sallwasser, Chatenay Malabry, all of France

[73] Assignee: Schlumberger Technology Corporation, New York, N.Y.

[21] Appl. No.: 793,742

[22] Filed: Nov. 18, 1991

[30] Foreign Application Priority Data

Nov. 23, 1990 [FR] France ................. 90 14670

[51] Int. Cl.⁵ ................. G01V 3/18; G01V 1/40; G01V 5/04; E21B 49/00
[52] U.S. Cl. .................... 324/367; 73/152; 181/102; 250/268; 324/338; 324/374; 367/25
[58] Field of Search ............. 324/323, 338–343, 324/367, 371, 374, 375; 73/152; 181/102, 105; 250/268; 367/25, 911

[56] References Cited

U.S. PATENT DOCUMENTS

| | | |
|---|---|---|
| 2,708,485 | 5/1955 | Vogel . |
| 2,994,398 | 8/1961 | Engle et al. . |
| 3,944,910 | 3/1976 | Rau ....................... 324/338 |
| 4,219,776 | 8/1980 | Arulanandan ............ 324/323 |
| 4,588,951 | 5/1986 | Ohmer ..................... 324/367 |
| 4,692,908 | 9/1987 | Ekstrom et al. ......... 367/27 |
| 4,958,073 | 9/1990 | Becker et al. .......... 250/269 |
| 5,036,283 | 7/1991 | Trouiller et al. ....... 324/375 |

FOREIGN PATENT DOCUMENTS 0239464 3/1987 European Pat. Off. .
1572213 5/1977 United Kingdom .

OTHER PUBLICATIONS

Wharton et al., "Electromagnetic propagation logging, advance in technique and interpretation," SPE 9267, 1980, pp. 1–12.

*Primary Examiner*—Gerard R. Strecker
*Attorney, Agent, or Firm*—Leonard W. Pojunas

[57] ABSTRACT

The apparatus includes a pad (20) pressed against the wall of a borehole (12), the pad comprising a plurality of detecting devices (42, 43, 44, 45) disposed in alignment along the longitudinal direction of the borehole. Each detecting device includes a housing (112, 113) having complementary ends fitted with electrical connectors. The end of one housing (112) is extended by first skirts (117, 118) suitable for interfitting between second skirts (121) of the complementary end of the housing (113) of an adjacent detecting device. An annular element (111) and screws (120, 122) fixed to complementary ends together thus constituting a rigid pad (20) which can be disassembled.

7 Claims, 5 Drawing Sheets

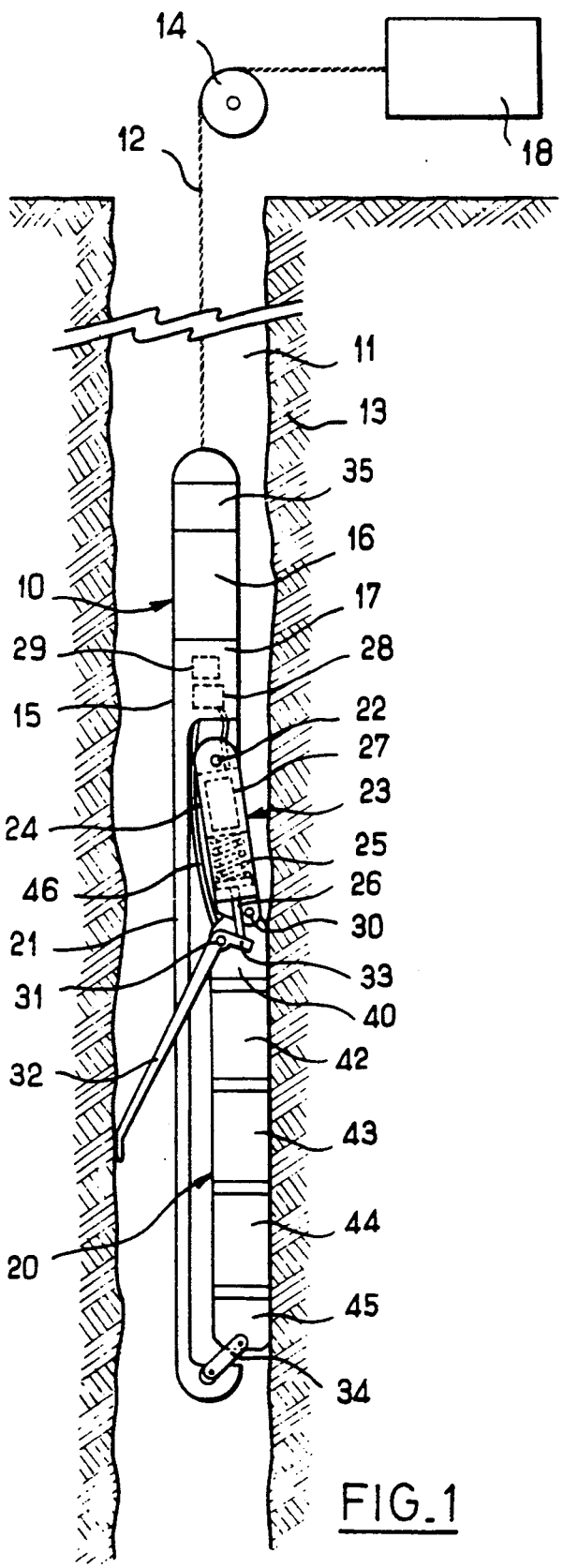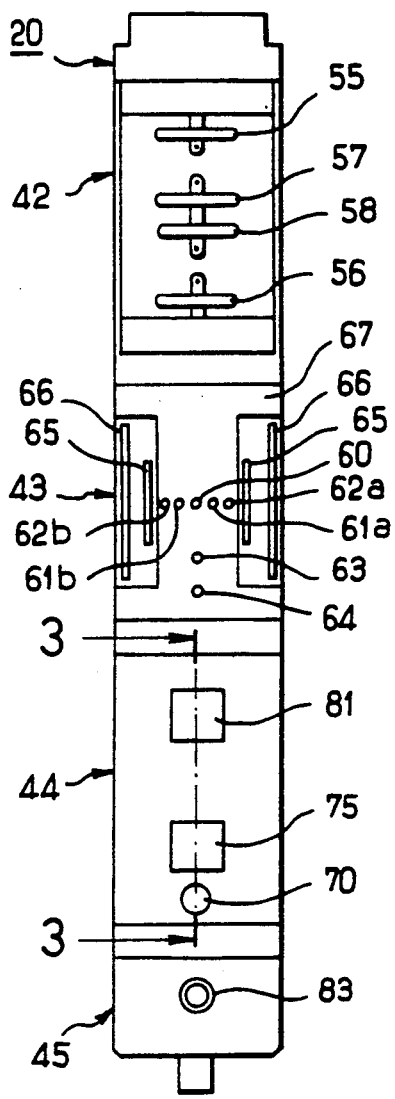
FIG_1
FIG_2

FIG_8

LOGGING APPARATUS HAVING A WALL ENGAGING PAD WITH LONGITUDINALLY ALIGNED DETECTING DEVICES

BACKGROUND OF THE INVENTION

A related invention is described in U.S. patent application Ser. No. 07/793,912, to Eyl for "Method and Apparatus for Handling Signals in a Logging Device" filed the same day as this application, and assigned to the same assignee.

The invention relates to investigating earth formations traversed by a borehole, and more particularly to a logging apparatus having a wall engaging pad for determining the petrophysical characteristics of the formations.

Numerous logging devices are known that include one or more pads suitable for being pressed against the wall of a borehole by means of a spring for the purpose of generating measurement signals representative of the physical parameters of the geological formations through which the borehole passes. One example of a device including a pad pressed against the wall of a borehole is described in U.S. Pat. No. 4,692,908 (Ekstrom et al.). The pad carries an array of electrodes and an array of acoustic transducers.

In order to satisfy present development of logging devices, it is necessary to provide pads of increasing complexity. It is therefore advantageous to be able to provide such pads in a form which is as compact as possible and which enable modifications to be performed either to satisfy differing local requirements, or else to enable future improvements or additions to be installed.

OBJECT OF THE INVENTION

An object of the invention is to provide a logging apparatus including a pad and satisfying the above requirements.

SUMMARY OF THE INVENTION

The present invention provides a logging apparatus for investigating earth formations traversed by a borehole, comprising an elongate pad urged against the wall of the borehole. The pad comprises a plurality of detecting devices disposed in alignment in the longitudinal direction of the borehole. Each detecting device comprises a housing having complementary first and second ends provided with electrical connectors. The first end of a housing longitudinally engages the second end of the housing of an adjacent detecting device so that the engaged ends are prevented from rotating relative to each other. The pad also comprises a fixing means for fixing the complementary first and second ends together in the longitudinal direction, thereby forming a rigid pad which can be disassembled.

Preferably the housing comprises a first end having longitudinally extending first skirt portions, and a second end having longitudinally extending second skirts portions. The first skirt portions of one housing interfit between the second skirt portions of an adjacent housing when one housing and an adjacent housing are engaged, thereby preventing these housings from rotating relative to each other. The fixing means include an annular element having a middle portion and two end portions. The middle portion engages the first skirt portions of the one housing and the second skirt portions of an adjacent housing. The end portions are fitted with sealing rings which provide a seal between the annular element and the two housings.

BRIEF DESCRIPTION OF THE DRAWINGS

The features and advantages of the invention appear more clearly from the following description given by way of non-limiting example and made with reference to the accompanying drawings, in which:

FIG. 1 is a diagrammatic view of logging apparatus of the invention shown in its operating position in a borehole;

FIG. 2 is a view of the wall engaging face of the pad of the FIG. 1 device;

DETAILED DESCRIPTION OF THE INVENTION

Figure 3:
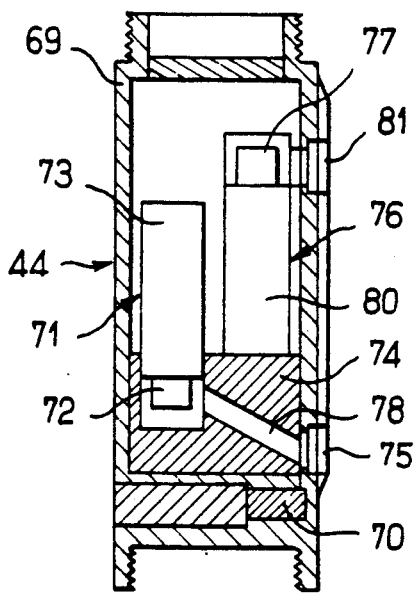
FIG. 3 is a diagrammatic longitudinal section on line 3—3 of the nuclear sensor of the pad of FIG. 2.

In the present description, the adjective "longitudinal" is used to designate a direction parallel to the axis of a borehole and the adjective "radial" is used to designate a direction perpendicular to said axis and perpendicular to the wall of the borehole. The term "azimuthal" is used to designate a direction perpendicular to the longitudinal and radial directions and tangential to the wall of the borehole.

With reference to FIG. 1, the logging apparatus of the invention comprises a downhole device 10 suspended in a borehole 11 that passes through an earth formation 13. The device 10 is fixed to the end of the cable 12 which passes over a sheave 14 and is wound on a surface winch (not shown) for moving the downhole device along the borehole 11. The cable 12 is connected to surface equipment 18 used for sending electrical control signals to the downhole device 10 and also for receiving, processing, displaying, and recording measurement signals coming from the downhole apparatus.

The downhole apparatus 10 comprises a body 15 whose top portion 16 is a sealed cartridge containing electronic circuits, and whose bottom portion 17 is fitted with a pad or skid 20 suitable for engaging the wall of the borehole 11. In the example shown, the bottom portion 17 of the body comprises a cradle 21 along which the pad 20 is received. A control device 23 for pressing the pad against the wall of the borehole is hinged to the top of the cradle about an axis 22.

The control device 23 comprises a sealed housing 24 containing a spring 25 which urges downwards on a rod 26 emerging from the bottom of the housing. The rod 26 is normally free to move under the action of a spring 25 and is capable of being brought by means of a hydraulic actuator 27 into a high position so that the pad 20 takes up a retracted position in the cradle 21. The hydraulic actuator 27 is driven towards its high position by hydraulic fluid under pressure provided by a pump 28 housed in the portion 17 of the body, for example. An electrically controlled valve (not shown) serves to release the pressure and thus to release the rod 26. A compensation device 29, e.g. including a floating piston, serves to maintain the hydraulic fluid at a pressure equal to or slightly greater than the pressure in the borehole.

The pad 20 is hinged about an axis 30 to the bottom end of the control device 23 and it includes a hinge axis 31 having a prop 32 pivotally mounted thereabout. The rod 26 of the control device 23 includes a stud 33 which is engaged in a slot in a crank extension of the prop 32. The spring 25 urges the rod 26 downwards, thereby moving the prop 32 away until it comes into contact with one of the walls of the borehole, thereby pressing one face of the pad 20 against the wall. A link 34 may be provided to limit the distance the bottom of the pad can be moved from the bottom of the cradle 21.

The pad 20 comprises an upper head 40 and a series of detecting devices or sensors 42 to 45 which are mechanically and electrically interconnected. The upper head is mechanically connected to the control device 23 via the axis 30 and it is electrically connected to the electronic circuits of the top cartridge 16 of the body 15 via a flexible connection 46. The various sensors 42–45 carry detection means disposed below one another on the face of the pad which presses against the wall of the borehole, as shown in FIG. 2.

The downhole device 10 preferably includes a conventional acceleration detector 35 above the cartridge 16 to provide signals representative of displacements of the pad 20 along the borehole. These signals are sent to the surface for obtaining accurate correction of the depth of the measurement signals provided by the various sensors 42 to 45. In response to the detected displacements of the pad, the measurement signals are repositioned longitudinally so that they relate to the same level.

The sensor 42 is a sensor responsive to the propagation characteristics of microwaves through the formation. Such a sensor is known in the art as an electromagnetic propagation transducer or "EPT" (Mark of Schlumberger) and is described, in particular, in U.S. Pat. No. 3,944,910 to Rau. This sensor emits a high frequency electromagnetic wave, e.g. at 1.1 GHz, and it receives electromagnetic energy via two antennas that are axially spaced apart, thereby providing two measurement signals representative of the attenuation $A_{tt}$ and of the transit time $T_{pl}$ of the electromagnetic wave. The technique used for obtaining these measurement signals is described in particular in the article entitled "Electro-magnetic propagation logging, advance in technique and interpretation" by R. Wharton et al., SPE 9267 (1980). The dielectric constant and the high frequency conductivity written $\epsilon'_{EPT}$ and $\sigma_{EPT}$ may be calculated on the basis of the signals $T_{pl}$ and $A_{tt}$.

In the example shown, the sensor 42 is fitted with two transmitting antennas 55 and 56 and two receiving antennas 57 and 58 which are connected to electronic circuits such as those described in the above-mentioned article for the purpose of providing the signals $T_{pl}$ and $A_{tt}$. The longitudinal resolution of this sensor depends on the distance between the antennas 57 and 58 and is about 2 inches (5 cm). Its azimuthal resolution and its radial penetration depth are also about 2 inches. The measurement signals obtained therefore relate to an investigated volume whose dimensions are about 2 inches in the longitudinal, radial, and azimuthal directions.

The sensor 43 is a focused microresistivity sensor of the type described in U.S. Pat. No. 5,036,283 to Trouiller et al. The face engaging the borehole wall includes measurement electrodes 60, 61a, 61b, 62a, 62b, 63, and 64, an active focusing system constituted by two monitoring electrodes 65 and two focusing electrodes 66, and a passive focusing system formed by an I-shaped guard electrode 67 surrounding the measurement electrode 60.

As explained in the Trouiller et al. patent, the electrodes are connected to suitable electronic circuits for implementing the following functions:

emitting a measurement current $I_o$ between each measurement electrode and the rear of the sensor 43 which serves as a current return;

detecting the potential difference between the guard electrode 67 and the pair of monitoring electrodes 65;

controlling the focusing current emitted by the pair of electrodes 66 so that the detected potential difference remains substantially zero; and emitting a guard current from the electrode 67 so that the potential of the measurement electrodes is equal to the potential of the guard electrode.

By maintaining the potential difference $V_{Ref}$ between the current return electrode and the measurement electrodes constant and by measuring each of the currents $I_o$ emitted thereby, signals $V_{Ref}/I_o$ are obtained which are representative of the resistivity $R_{xo}$ of zones in the vicinity of the wall of the borehole and situated opposite each of the measurement electrodes. Each measurement electrode 60, 61a, 61b, 62a, and 62b provides an initial measurement signal whose radial penetration depth is close to 2 inches. Resolution, longitudinally and in azimuth, is governed by the dimensions of the electrode and may reach a minimum of 1.3 mm.

By combining the signals obtained on the transversely aligned measurement electrodes 60, 61a, 61b, 62a, and 62b, a combined measurement signal is generated which corresponds to an investigated zone whose azimuthal coverage is about 2 inches. By combining the signals obtained at a plurality of locations in the borehole along the longitudinal direction, a final combined measurement signal is generated which corresponds to an investigated zone whose longitudinal dimension is about 2 inches as are its azimuthal and radial dimensions. The desired longitudinal resolution and azimuthal coverage of about 2 inches could also be obtained using a single measurement electrode having larger dimensions in the azimuthal and longitudinal directions.

However it is preferable to use a row of electrodes of small dimensions for generating the initial measurement signals which, after being recorded, provide an image of the wall of the borehole over a width corresponding to the azimuthal coverage of the sensor 43.

The sensor 44 is a nuclear sensor responsive to the density and to the photoelectric absorption of the zone adjacent to the wall of the borehole, using the technique described in U.S. Pat. No. 4,958,073 to Becker et al.

With reference to FIG. 3, this sensor comprises a housing 69 containing a non-collimated source 70 of gamma rays which may be constituted by a conventional cesium 137 source. A first scintillation detector 71 constituted by a crystal 72 optically coupled to a photomultiplier 73 is disposed very close to the source 70 to detect the gamma rays which are backscattered in the formation. A screen 74, e.g. made of uranium, is interposed between the source 70 and the detector 71 to protect the detector 71 from gamma rays coming directly from the source. The screen 74 includes a sloping passage 78 to collimate the detector 71, i.e. to put a limit on the solid angle over which the detector examines the formation. A window 75 made of beryllium with external protection made of carbon provides good transmission for gamma rays while withstanding fluid pressure inside the borehole.

A second detector 76 is constituted by a scintillation crystal 77 optically coupled to a photomultiplier 80 and disposed facing a window 81 made of beryllium and carbon. The second detector 76 is situated at a greater distance from the than is the first detector, e.g. at about 15 cm. The crystals 72 and 77 may be crystals of gadolinium orthosilicate doped with cerium (GSO) in order to improve their counting rates. The detectors 71 and 76 are connected to electronic circuits for detecting gamma rays received over a plurality of energy windows and for processing the counting rates obtained in order to generate signals representative of the density $Rho_b$ and the photoelectric absorption $P_{ef}$ of a zone adjacent to the wall of the borehole. The geometry of the sensor is chosen in such a manner that its radial penetration depth and its azimuthal resolution are equal to about 2 inches. In the longitudinal direction, the investigated zone is too long. Deconvolution is applied to the responses from the detectors in order to obtain a corrected measurement signal whose resolution is reduced, after processing, to about 2 inches.

The detecting device 45 is an acoustic sensor for measuring the distance between the pad and the wall, the thickness of the mud cake, and the acoustic impedance of the formation in close proximity to the wall of the borehole. This sensor comprises a piezoelectric transducer 83 for emitting ultrasound pulses and for receiving echoes of these pulses. This technique is described in U.S. Pat. No. 4,692,908 to Ekstrom et al. For each pulse, the received wave is analyzed to provide the amplitude and the transit time of the echo from the formation and of the echo from the cake of mud. Appropriate electronic circuits are connected to the transducer to perform these operations. This sensor may comprise a plurality of ultrasound transducers in order to obtain information about the distance of the pad from the wall and the thickness of the cake of mud at various locations along the pad.

This information is important since it serves to specify with greater accuracy the investigated zone facing the pad, and in particular the thickness of the drilling mud (contact of varying quality between the pad and the wall of the borehole) and the thickness of the cake of mud contained in this zone. The thickness of the cake of mud is used to correct the responses from some of the sensors and in particular the response from the nuclear sensor 44 which is particularly sensitive to this cake. The sensor 45 may also include a row of ultrasonic transducer disposed along the azimuthal direction to form an image of the borehole wall over a width that corresponds to the azimuthal coverage of the other sensors.

The main petrophysical characteristics of formation that need to be determined in oil prospecting are clay content, porosity, and fluid saturation of the formation. As explained above, the apparatus of the invention provides a set of physical measurements attenuation $A_{tt}$, propagation time $T_{pl}$, resistivity of the flushed zone $R_{xo}$, density $Rho_b$, and photoelectric absorption $P_{ef}$ relating to a single zone of the formation situated in the vicinity of the borehole wall, on one side thereof and having longitudinal, radial, and azimuthal dimensions of about 2 inches. The above-mentioned petrophysical characteristics can be obtained by combining this coherent set of measurements in the narrowly-defined investigated zone even in the event of difficulties in shaly formations or in formations that are lithologically complex. These petrophysical characteristics may be obtained by combining the measurement signals by means of a computer programmed using the techniques known to the person skilled in the art and included in the surface equipment 18.

With respect to lithological characteristics, the measurements from the EPT sensor and from the nuclear sensor complement each other to discriminate between three types of rock such as sandstones, limestones, and dolomites, with the EPT sensor being selectively sensitive to limestones and to sandstones, while the nuclear sensor is more suitable for discriminating dolomites. With respect to clay content, the nuclear sensor and the microresistivity sensor provide two measurements indicative of clay content. From the point of view of fluid saturation, the EPT sensor complements the microresistivity sensor to determine the fluid content of the invaded zone, the clay content thereof, and optionally its cementing factor m.

The selection of three sensors, namely a nuclear sensor, a microresistivity sensor, and an EPT sensor, in association with an optional ultrasound sensor for additional information on the distance of the pad from the borehole wall and on the cake of mud, thus constitutes a judicious combination for high resolution evaluation of earth formations. With certain "clean" formations, i.e. formations which are shale-free, and with certain formations that are lithologically simple, the number of sensors may be reduced and one or other of them may be replaced by a dummy sensor. The apparatus of the invention makes this option possible.

The sensors 42 to 45 are interconnected by mechanical and electrical connections so as to form a modular pad assembly. One or more of these sensors may be omitted or replaced by a dummy sensor so that only a fraction of the above-described measurements is performed. The pad can thus be adapted quickly to local conditions or to special requests of the borehole supervisor.

Figure 4:
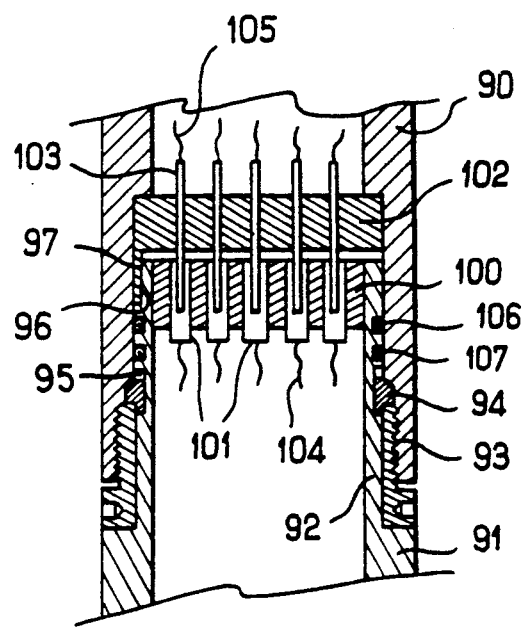
FIG. 4 is a longitudinal section through a portion of the pad of FIG. 2 showing how connections are made between sensors.

One example of sensor interconnection is shown in FIG. 4. An upper sensor comprises a tubular housing 90 adapted to be connected to the tubular housing 91 of a lower sensor. The housing 91 of the lower sensor has a narrower top portion 92 onto which a fixing collar 93 is rotatably mounted, the collar having an outside thread suitable for engaging in a corresponding tapped portion in the housing 90.

The fixing collar 93 is held longitudinally on the housing 91 by two half-rings 94 engaging in an annular groove 95 of the top portion 92 of the housing 91. The two half-rings 94 are themselves held in place by a resilient split pin. The top of the top portion 92 has a longitudinal keyway 96 in its outside face and is closed by a transverse partition 100 which carries female electrical connectors 101. A transverse partition 102 is fixed in the housing 90 of the top module and carries male electrical connectors 103 adapted to engage in the female connectors 101. The transverse partition 102 is extended downwards by a tongue 97 which engages in the keyway 96 in order to bring the male and female connectors into alignment.

By screwing the fixing collar 93 into the housing 90 of the top sensor, the two sensors are interconnected both electrically and mechanically. The electronic circuits of the two sensors are connected to respective ones of the electrical connectors 101 and 103 via connection wires 104 and 105. Sealing rings 106 and 107 are mounted on the top portion 92 in order to provide sealing between the housings 90 and 91 of the sensors.

Figure 5:
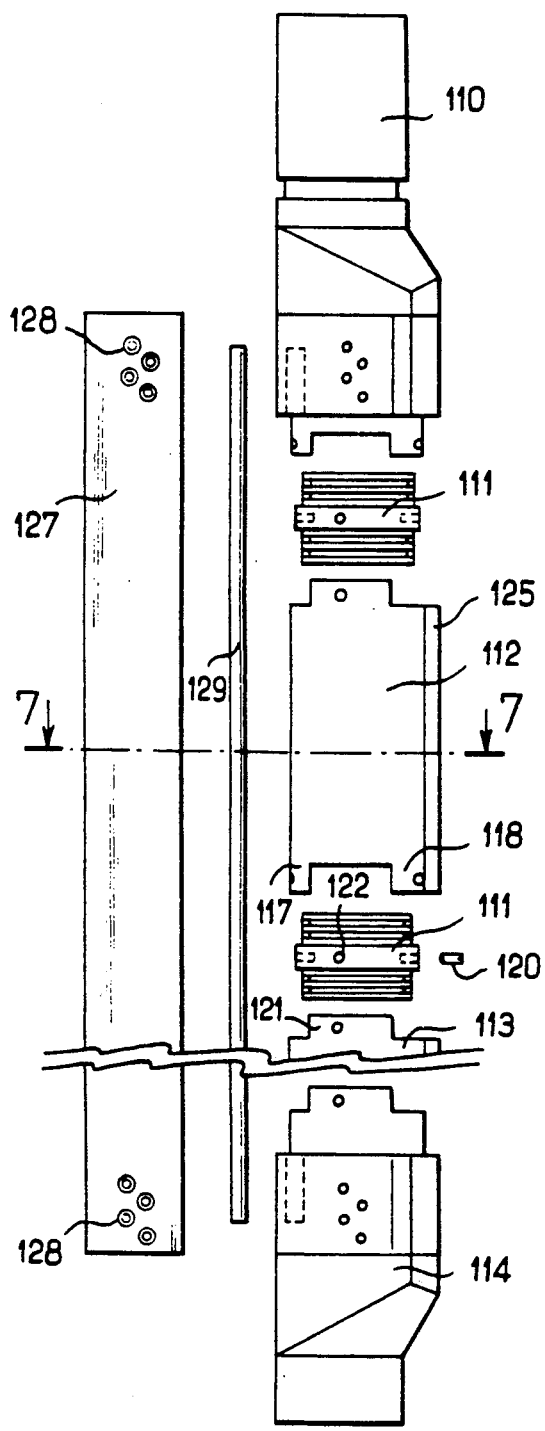
FIG. 5 is an exploded view of another embodiment of the FIG. 2 pad.
Figure 6:
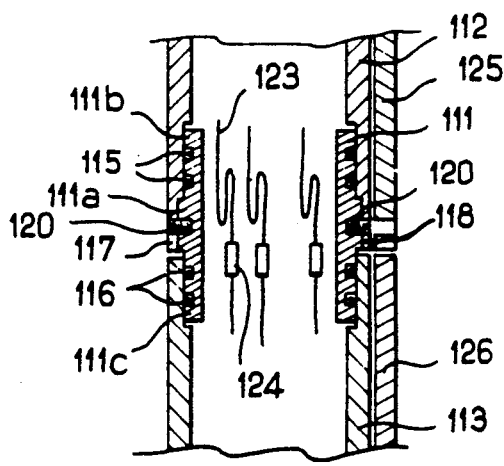
FIG. 6 is a longitudinal section through a portion of the FIG. 5 pad showing another way of interconnecting sensors.
Figure 7:
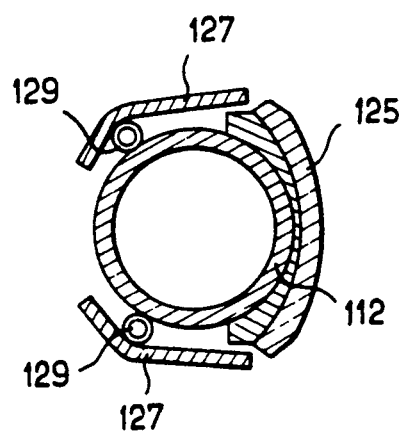
FIG. 7 is a diagrammatic cross-section on line 7—7 of the FIG. 5 pad.

FIGS. 5 to 7 show another, more compact embodiment of the pad of FIG. 2, in particular with respect to the connections between the sensors. The pad comprises a top head 110, fixing rings 111, sensor housings 112 and 113, and a bottom head 114. The connection between the top head and the top sensor 112 and the connection between the bottom sensor and the bottom head 114 are similar to the connection between two successive sensors, as shown in FIG. 6. The fixing ring 111 is constituted by a middle portion 111a extended upwards and downwards by portions 111b and 111c of smaller outside diameter. Two peripheral grooves are cut out in each of the thinner portions 111b and 111c for receiving sealing rings 115 and 116.

The bottom end of the housing 112 includes an inside cutout adapted to receive the thinner portion 111b of the ring 111 and is extended downwards by two skirts 117 and 118 that are even thinner, and which overlie the middle portion 111a of the fixing ring 111. The housing 112 is fixed to the ring 111 by screws 120 which pass through the skirts 117 and 118.

The top end of the bottom housing 113 is made like the top housing 112 to engage in sealed manner on the ring 111. This end is extended upwards by two skirts 121 adapted to be interposed between the skirts 117 and 118 of the housing 112 when the housing 113 is engaged on the ring 111. Screws 122 pass through the skirts 121 to fix the shell 113 onto the fixing ring 111. This fixing locks two adjacent sensors both longitudinally and in rotation, while nevertheless making it possible to assemble sensors quickly and also making it possible to change or remove sensors. The electrical connections between one sensor and another are provided by flexible insulated wires 123 interconnected by connectors 124.

The face of each housing 112 and 113 that comes into contact with the wall of the borehole is fitted with curved pieces 125 and 126 that impart the desired curvature to such bearing faces. The edges of the curves pieces 125 and 126 of two adjacent sensors are disposed longitudinally very close to one another so that the bearing face of the pad as a whole is practically continuous. Longitudinally extending members 127 fixed by screws 128 to the top and bottom heads may be provided to stiffen the pad. Tubes 129 are preferably mounted between the top head 110 and the bottom head 114 for installing direct electrical connections between the two heads. This embodiment of the pad makes it possible to connect further logging devices beneath the pad 20. This pad can be made sufficiently rigid for it to be possible to envisage omitting the cradle 21.

Figure 8:
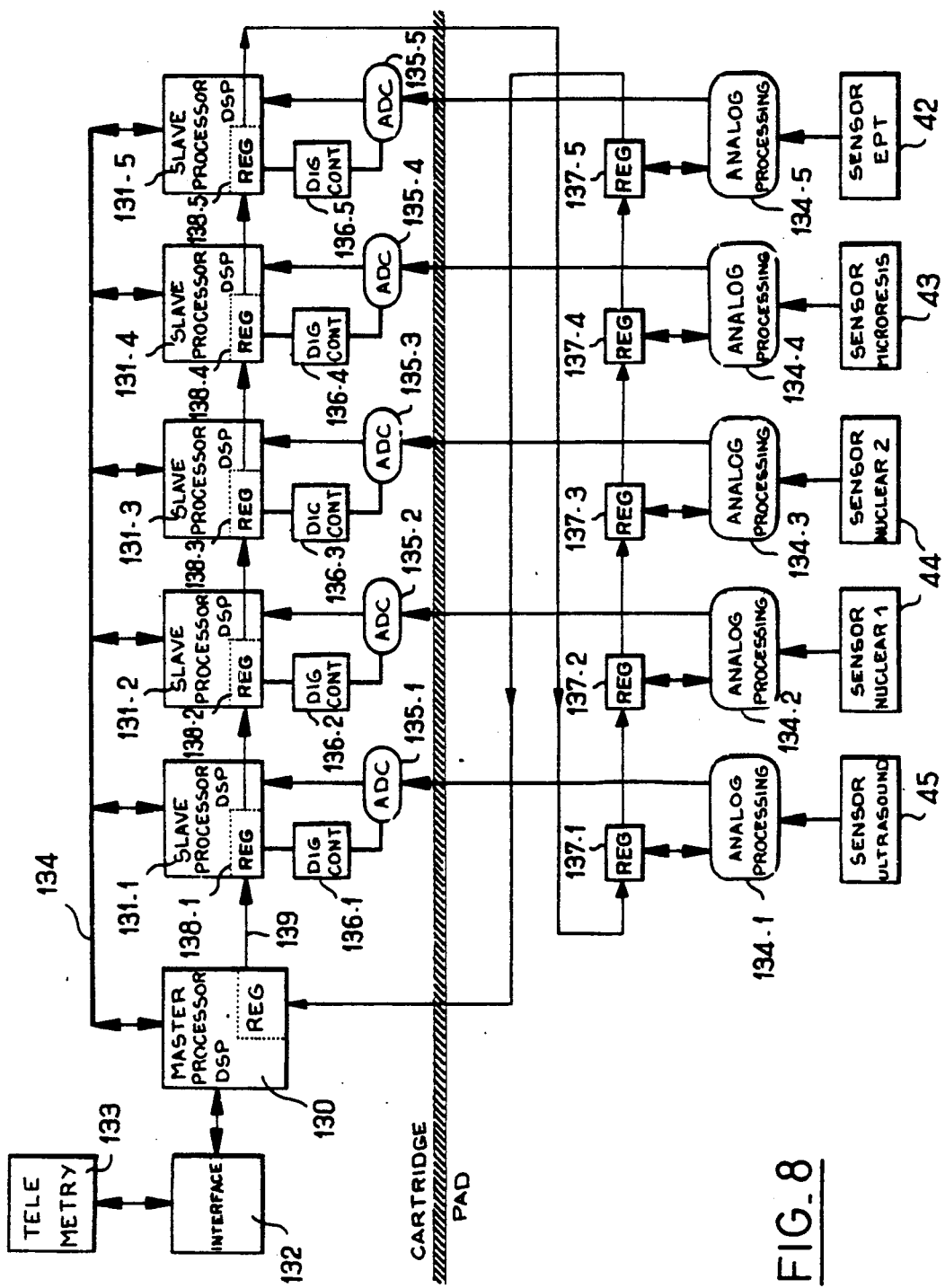
FIG. 8 is a simplified block diagram of the circuits used in the apparatus of the invention.

FIG. 8 is a block diagram of the electrical circuits used in the downhole device 10. These circuits comprise a master digital signal processor (DSP) 130 which controls the operation of slave digital processors 131-1 to 131-5 associated with the various sensors. The master processor 130 is connected via an interface 132 to telemetry circuits 133 adapted to receive and demodulate signals received from the surface equipment 18, and also to modulate and transmit the information coming from the sensors.

The master processor 130 is connected to the slave processors via a bidirectional link 134. Communication from the master processor to the slave processors relates mostly to control information received from the surface. Communication from the slave processors to the master processor serves to transmit all the measurement data acquired by the sensors. Each slave processor builds a message containing information relating to a measurement. The master processor acts as a buffer and as a message handler for transferring them to the surface. The communication protocol depends on the processor used.

In this example, the link 134 has four conductors. Two of the conductors serve to transfer data, one for sending "down" data blocks from the master processor to the slave processors, and the other for receiving "up" data blocks from the slave processors. A third conductor transmits clock pulses to the slave processors. The fourth conductor carries a synchronization signal used for identifying the befinning of each data block transmitted over the first two conductors.

Each block is made up of a determined number of words (e.g. 32). Each slave processor is programmed to receive some of the words in a down block as specified by their arrival times, and to ignore the other words. Similarly, each processor is programmed to transmit during some of the words of an up block and to be deactivated over time intervals that correspond to the other words. The type of digital processor used is selected to make flexible programming of the slave processors possible, with the number and order of words attributed to a slave processor being selectable as a function of need and not necessarily being sequential.

At least one slave processor is associated with each sensor, and a plurality of processors may be associated with the same sensor, as applies, for example, to processors 131-2 and 131-3, both of which are associated with the nuclear sensor 44. In addition to having at least one slave processor 131-i, each measurement module comprises an analog processing circuit 134-i connected to an analog-to-digital converter 135-i controlled by a digital control circuit 136-i. The digital output of each analog-to-digital converter 135-i is connected to the corresponding processor 131-i.

Each analog processing circuit 134-i performs specific operations that are required for the operation of each sensor as described above and under the control of signals coming from a sequence of parallel output shift registers 137-i. The shifts registers 137-i are connected in series by a line 139 with a corresponding sequence of parallel input shift registers 138-i situated in the slave processors 131-i so as to constitute a shuttle-type link between each slave processor and the associated analog processing circuit. The circuits 134-i and 137-i may be situated in the pad while the other circuits 130, 132, 133, and 131-i, 135-i, 136-i are disposed in the sealed cartridge 16 of the device. Naturally the way in which the circuits are shared between the pad and the cartridge could be different. For one or more of the sensors, if there is room inside the sensor body, it is possible to install a larger number of electronic circuits inside the pad, e.g. the slave processor 131-i itself together with the analog-to-digital converter 135-i. Such a disposition reduces the number of electrical connections required between the cartridge and the pad, and above all it reduces the number of analog signal transfers required therebetween.

The shuttle link makes it possible to use a minimum of connectors to transmit control signals from each slave processor to the corresponding sensor. This link also makes it possible to receive signals specifying the status of the sensors.

Figure 9:
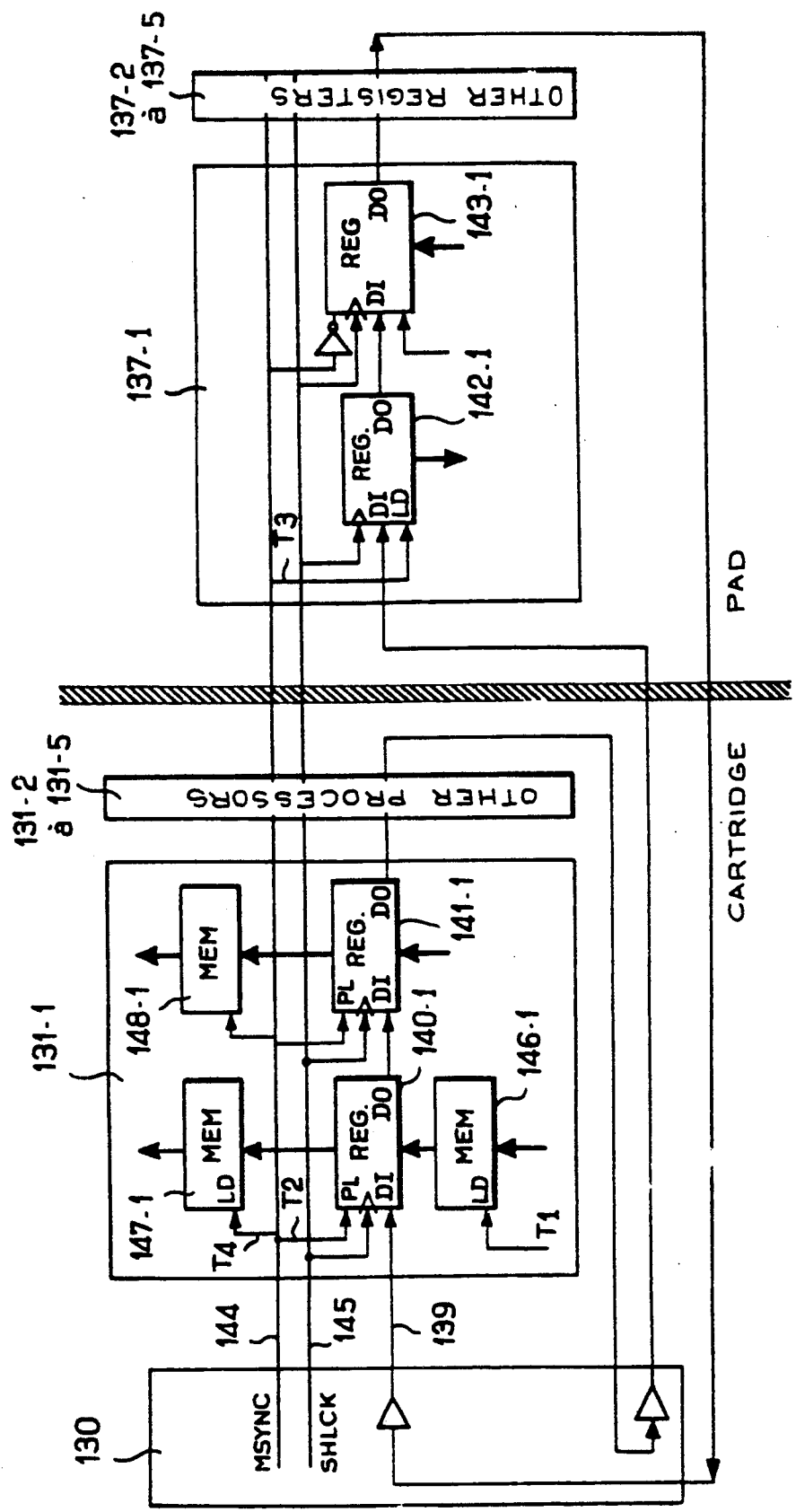
FIG. 9 is a more detailed diagram of a portion of the electronic circuits shown in FIG. 8.

FIG. 9 shows the portions of the electronic circuits that constitute the shuttle-link and in particular the portions relating to the slave processor 131-1 and to the associated circuits in the ultrasound sensor. The shuttle-link comprises a looped chain of shift registers with the data outputs (DO) of one register being connected by the line 139 to the data inputs (DI) of the following register. The register 138-1 of slave processor 131-1 in fact comprises two shift registers 140-1 and 141-1, and the register 137-1 comprises two shift registers 142-1 and 143-1.

The master processor 130 generates a synchronizing signal MSYNC on a line 144 and a clock signal SHLCK on a line 145. The synchronizing signal MSYNC specifies the rate at which data is updated with the same rate applying both to control data being sent to the sensors and to status data coming from the sensors. The clock signal SHLCK shifts data from one shift register such as 140-1 to an associated register such as 142-1. Simultaneously, the clock signal SHLCK also shifts data from a register such as 143-1 to an associated register 141-1 of the corresponding processor 131-1. The number of successive SHLCK pulses is thus equal to one-half of the total number of bits in the chain of registers 140-$i$, 141-$i$, 142-$i$, and 143$i$.

Each slave processor such as 131-1 also comprises an input buffer memory 146-1 connected to the parallel input of the register 140-1, and two output buffer memories 147-1 and 148-1 connected respectively to the parallel outputs of the registers 140-1 and 141-1. Control data is transferred, for example, by four MSYNC pulses T1 to T4 applied in succession to the write input (LD) of buffer memory 146-1, to the loading input (PL) of register 140-1, to the unloading input (LD) of the register 142-1, and to the write input (LD) of the buffer memory 147-1.

Between any one MSYNC pulse and the next, a series of SHLCK pulses is delivered. Pulse T1 loads a control signal into buffer memory 146-1, and pulse T2 loads the control signal into register 140-1, after which this control signal is transferred to register 142-1 by SHLCK pulses. Pulse T3 unloads the control signal into the analog processing circuit of the sensor. After a further transfer to register 140-1 by SHLCK pulses, the control signal is loaded in the output buffer memory 147-1 by pulse T4. It is thus possible to verify that the control signal has been properly transferred along the shuttle-link. The output buffer memory 148-1 receives status data relating to the sensor by a similar process, with the data being loaded into register 143-1 and then transferred into register 141-1 of the slave processor 131-1.

The above-described electronic circuits constitute an architecture which makes the sensors independent from one another and makes it possible to replace a sensor in the pad by a dummy sensor, or even to replace a sensor by a different sensor adapted to measure a different physical parameter, without thereby disturbing the operation of the remaining sensors. The apparatus of the invention can thus be adapted to measuring different combinations of physical parameters depending on the local requirements or conditions that are encountered. The possibility of interconnecting the sensors quickly further facilitates replacing one sensor by another.

We claim:

1. A logging apparatus for investigating earth formations traversed by a borehole, the apparatus comprising:
   an elongate pad adapted to engage the wall of the borehole, the elongate pad comprising a plurality of detecting devices comprising means for detecting earth formation characteristics, the plurality of detecting devices in alignment in the longitudinal direction of the borehole, each of said detecting devices comprising a housing having complementary first and second ends provided with electrical connectors, said first end of one housing longitudinally engaging the second end of an adjacent housing to form a means for preventing rotation of said one housing and said adjacent housing relative to each other; and
   fixing means for fixing the first end of said one housing to the second end of said adjacent housing in the longitudinal direction, thereby forming a rigid pad which can be disassembled.

2. Apparatus according to claim 1, wherein said electrical connectors comprise complementary first and second connectors respectively fixed to said first and second complementary ends of the housing so that said first connectors of said one housing engage said second connectors of said adjacent housing when said one and adjacent housings engage each other.

3. Apparatus according to claim 1, further comprising:
   first skirt portions longitudinally extending said first end of said housing, and
   second skirts portions longitudinally extending the complementary second end of said housing, said first and second skirt portions being designed so that the first skirt portions of one housing interfit between the second skirts of an adjacent housing when said one and adjacent housings are engaged together, thereby preventing said one and adjacent housings from rotating relative to each other.

4. Apparatus according to claim 3, wherein said fixing means include an annular element having a middle portion and two end portions, said middle portion engaging said first skirt portions of said one housing and said second skirt portions of said adjacent housing.

5. Apparatus according to claim 4, wherein said fixing means include radial screws for locking said first and second skirt portions on the middle portion of the annular element.

6. Apparatus according to claim 4, comprising sealing rings on said end portions of said annular element for providing a seal between said annular element and said one and adjacent housings.

7. Apparatus according to claim 1, wherein said apparatus includes a bottom head for mechanically and electrically connecting said pad to an additional logging device.

* * * * *